United States Patent
Wu

(10) Patent No.: US 10,800,645 B2
(45) Date of Patent: Oct. 13, 2020

(54) METHOD, DEVICE AND SYSTEM FOR AUTOMATIC OILING OF LONG-DISTANCE TRANSPORT VEHICLE

(71) Applicant: TuSimple, Inc., San Diego, CA (US)

(72) Inventor: Nan Wu, Beijing (CN)

(73) Assignee: TUSIMPLE, INC., San Diego, CA (US)

(*) Notice: Subject to any disclaimer, the term of this patent is extended or adjusted under 35 U.S.C. 154(b) by 101 days.

(21) Appl. No.: 16/035,659

(22) Filed: Jul. 15, 2018

(65) Prior Publication Data
US 2019/0023558 A1    Jan. 24, 2019

(30) Foreign Application Priority Data
Jul. 21, 2017   (CN) .......................... 2017 1 0600483

(51) Int. Cl.
*B67D 7/30* (2010.01)
*G01C 21/34* (2006.01)
(Continued)

(52) U.S. Cl.
CPC ............. *B67D 7/30* (2013.01); *B67D 7/0401* (2013.01); *G01C 21/3415* (2013.01);
(Continued)

(58) Field of Classification Search
USPC ....................................................... 701/29.1
See application file for complete search history.

(56) References Cited

U.S. PATENT DOCUMENTS

| 6,777,904 B1 | 8/2004 | Degner |
|---|---|---|
| 7,103,460 B1 | 9/2006 | Breed |

(Continued)

FOREIGN PATENT DOCUMENTS

| CN | 102878998 A | 1/2013 |
|---|---|---|
| CN | 104276089 A | 1/2015 |

(Continued)

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

(Continued)

*Primary Examiner* — Tyler D Paige
(74) *Attorney, Agent, or Firm* — Paul Liu; Perkins Coie, LLP.

(57) ABSTRACT

The present application discloses a method, device and system for automatic oiling of a long-distance transport vehicle. The method provided by the present application includes: obtaining, by a transport planning system at a network side, vehicle status information, transport mission information and highway port information of the vehicle before the long-distance transport vehicle starts from a highway port of departure; generating a transport plan according to the vehicle status information, the transport mission information and the highway port information, wherein the transport plan comprises at least one highway port to be stopped at, cargo quantity to be loaded at each highway port to be stopped at and oil mass to be filled at each highway port to be stopped at; and sending the transport plan to the vehicle.

19 Claims, 6 Drawing Sheets

(51) Int. Cl.
  *G08G 1/0968* (2006.01)
  *G07C 5/00* (2006.01)
  *G05D 1/00* (2006.01)
  *B67D 7/04* (2010.01)
  *G08G 1/0967* (2006.01)
  *G08G 1/00* (2006.01)
  *H04W 4/40* (2018.01)

(52) U.S. Cl.
  CPC ....... *G01C 21/3453* (2013.01); *G05D 1/0088* (2013.01); *G07C 5/008* (2013.01); *G08G 1/0967* (2013.01); *G08G 1/0968* (2013.01); *G08G 1/096816* (2013.01); *G08G 1/096844* (2013.01); *G08G 1/202* (2013.01); *B67D 2007/0442* (2013.01); *G05D 2201/0213* (2013.01); *H04W 4/40* (2018.02)

(56) References Cited

U.S. PATENT DOCUMENTS

| | | |
|---|---|---|
| 7,783,403 B2 | 8/2010 | Breed |
| 8,412,449 B2 | 4/2013 | Trepagnier |
| 8,788,134 B1 | 7/2014 | Litkouhi |
| 8,965,621 B1 | 2/2015 | Urmson |
| 9,002,632 B1 | 4/2015 | Emigh |
| 9,111,444 B2 | 8/2015 | Kaganovich |
| 9,134,402 B2 | 9/2015 | Sebastian |
| 9,248,835 B2 | 2/2016 | Tanzmeister |
| 9,315,192 B1 | 4/2016 | Zhu |
| 9,317,033 B2 | 4/2016 | Ibanez-guzman |
| 9,342,074 B2 | 5/2016 | Dolgov |
| 9,399,397 B2 | 7/2016 | Mizutani |
| 9,438,878 B2 | 9/2016 | Niebla |
| 9,476,970 B1 | 10/2016 | Fairfield |
| 9,535,423 B1 | 1/2017 | Debreczeni |
| 9,568,915 B1 | 2/2017 | Berntorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 2004/0236706 A1* | 11/2004 | Fitch ................. B60R 16/0234 705/400 |
| 2008/0249667 A1 | 10/2008 | Horvitz |
| 2009/0040054 A1 | 2/2009 | Wang |
| 2010/0023162 A1 | 1/2010 | Gresak et al. |
| 2010/0049397 A1 | 2/2010 | Lin |
| 2011/0297484 A1* | 12/2011 | Williams, Jr. ............ F16N 7/22 184/6.1 |
| 2016/0321381 A1 | 11/2016 | English |
| 2016/0358129 A1* | 12/2016 | Walton .................. G06Q 10/20 |
| 2016/0375907 A1 | 12/2016 | Erban |
| 2018/0046964 A1* | 2/2018 | Leoni .................. G06Q 10/083 |
| 2019/0023558 A1* | 1/2019 | Wu ..................... G01C 21/3453 |
| 2019/0232971 A1* | 8/2019 | Vijayakumar .......... H04L 67/12 |

FOREIGN PATENT DOCUMENTS

| | | |
|---|---|---|
| CN | 105894669 A | 8/2016 |
| CN | 106525063 A | 3/2017 |
| CN | 106871922 A | 6/2017 |
| JP | 2013067422 A | 4/2013 |

OTHER PUBLICATIONS

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Duff Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

Adhiraj Somani, Nan Ye, David Hsu, and Wee Sun Lee, "DESPOT: Online POMDP Planning with Regularization", Department of Computer Science, National University of Singapore, date unknown.

(56) References Cited

OTHER PUBLICATIONS

Adam Paszke, Abhishek Chaurasia, Sangpil Kim, and Eugenio Culurciello. Enet: A deep neural network architecture for real-time semantic segmentation. CoRR, abs/1606.02147, 2016.
Fist Office Action in Chinese Application No. 201710600483.2 dated Jul. 5, 2018.
Supplementary Search in Chinese Application No. 201710600483.2 dated Aug. 17, 2018.

* cited by examiner

METHOD, DEVICE AND SYSTEM FOR AUTOMATIC OILING OF LONG-DISTANCE TRANSPORT VEHICLE

CROSS-REFERENCES TO RELATED APPLICATIONS

The present application claims the priority from Chinese Patent Application No. 201710600483.2, filed with the Chinese Patent Office on Jul. 21, 2017 and entitled "METHOD, DEVICE AND SYSTEM FOR AUTOMATIC OILING OF LONG-DISTANCE TRANSPORT VEHICLE", which is hereby incorporated by reference in its entirety.

FIELD OF INVENTION

The invention relates to the intelligent transportation field and particularly to a method, device and system for automatic oiling of a long-distance transport vehicle.

BACKGROUND

At present, the interests of long-distance transport mainly depends on the cargo weight. How to plan the cargo weight to be transported of vehicles effectively affects the interests of long-distance transport.

The amount of loaded oil of a vehicle is also a part of the overall cargo weight of the vehicle. For example, the full capacity of the oil tank of the van of the C&C TRUCKS is 500 liters, and the full capacity of the dual oil tanks of the Shanxi Automobile heavy truck is 800 liters+400 liters. If the amount of the loaded oil in oil tank is in the full-load state when the vehicle starts, the cargo weight may be reduced obviously; if the amount of loaded oil is reduced in order to increase the cargo weight, the amount of loaded oil may be not enough when an emergency occurs, which results in the delay of transport progress.

BRIEF SUMMARY

In view of the above-mentioned situation, the present application provides a method, device and system for automatic oiling of a long-distance transport vehicle.

According to one aspect of the present application, some embodiments provide a method for automatic oiling of a long-distance transport vehicle, which includes: obtaining, by a transport planning system at a network side, vehicle status information, transport mission information and highway port information of the vehicle before the vehicle starts from a highway port of departure; generating a transport plan according to the vehicle status information, the transport mission information and the highway port information, wherein the transport plan comprises at least one highway port to be stopped at, and cargo quantity to be loaded at each highway port to be stopped at and oil mass to be filled at each highway port to be stopped at; and sending the transport plan to the vehicle, so that the vehicle stops at the highway port to be stopped at according to the transport plan, performs loading and/or unloading of cargo according to the cargo quantity to be loaded at the stopped-at highway port, and is filled with oil according to the oil mass to be filled at the stopped-at highway port.

According to one aspect of the present application, some embodiments provide a method for automatic oiling of a long-distance transport vehicle, which includes: receiving, by an automatic oiling system of the vehicle, a transport plan from a transport planning system before the long-distance transport vehicle starts from a highway port of departure, wherein the transport plan includes at least one highway port to be stopped at, and cargo quantity to be loaded at each highway port to be stopped at and oil mass to be filled at each highway port to be stopped at; according to the transport plan, prompting, by the automatic oiling system, the vehicle to stop at the highway port to be stopped at and perform loading and/or unloading of cargo according to the cargo quantity to be loaded at the stopped-at highway port; and sending information of the oil mass to be filled at the stopped-at highway port to an oiling device within the stopped-at highway port, so that the vehicle obtains oil fuel filled by the oiling device according to the oil mass to be filled.

According to another aspect of the present application, some embodiments provide a method for automatic oiling of a long-distance transport vehicle, which includes: receiving, by an oiling device, information of oil mass to be filled from the long-distance transport vehicle; and filling oil fuel to the vehicle according to the information of the oil mass to be filled.

According to another aspect of the present application, some embodiments provide a device for automatic oiling of a long-distance transport vehicle, which is at a network side and includes a memory, a processor and a transceiver; the memory is configured to store at least one machine executable instruction; the processor is configured to execute the instruction stored in the memory to: obtain vehicle status information, transport mission information and highway port information of the vehicle; generate a transport plan according to the vehicle status information, the transport mission information and the highway port information, wherein the transport plan comprises at least one highway port to be stopped at, and cargo quantity to be loaded at each highway port to be stopped at and oil mass to be filled at each highway port to be stopped at; and send, by invoking the transceiver, the transport plan to the vehicle, so that the vehicle stops at the highway port to be stopped at according to the transport plan, performs loading and/or unloading of cargo according to the cargo quantity to be loaded at the stopped-at highway port, and is filled with oil according to the oil mass to be filled at the stopped-at highway port; the transceiver is configured to receive and send information according to invoking by the processor.

According to another aspect of the present application, some embodiments provide a device for automatic oiling of a long-distance transport vehicle, which is within the long-distance transport vehicle and includes a memory, a processor and a transceiver; the memory is configured to store at least one machine executable instruction; the processor is configured to execute the instruction stored in the memory to: receive, by invoking the transceiver, a transport plan from an automatic oiling device at a network side, wherein the transport plan comprises at least one highway port to be stopped at, and cargo quantity to be loaded at each highway port to be stopped at and oil mass to be filled at each highway port to be stopped at; according to the transport plan, prompt the vehicle to stop at the highway port to be stopped at and perform loading and/or unloading of cargo according to the cargo quantity to be loaded at the stopped-at highway port; and send, by invoking the transceiver, information of the oil mass to be filled at the stopped-at highway port to an oiling device within the stopped-at highway port, so that the vehicle obtains oil fuel filled by the oiling device according to the oil mass to be filled; the transceiver is configured to receive and send information according to invoking by the processor.

According to another aspect of the present application, some embodiments provide a device for automatic oiling of a long-distance transport vehicle, which is within an oiling device and includes a memory, a processor and a transceiver; the memory is configured to store at least one machine executable instruction; the processor is configured to execute the instruction stored in the memory to: receive, by invoking the transceiver, information of oil mass to be filled from the long-distance transport vehicle; and fill oil fuel to the vehicle according to the information of the oil mass to be filled; the transceiver is configured to receive and send information according to invoking by the processor.

According to another aspect of the present application, some embodiments provide a system for automatic oiling of a long-distance transport vehicle, which includes a transport planning system at a network side, an automatic oiling system on the vehicle and an oiling device within a highway port; wherein: the transport planning system is configured to obtain receive vehicle status information, transport mission information and highway port information of the vehicle before the long-distance transport vehicle starts from a highway port of departure; generate a transport plan according to the vehicle status information, the transport mission information and the highway port information, wherein the transport plan comprises at least one highway port to be stopped at, and cargo quantity to be loaded and oil mass to be filled at each highway port to be stopped at; and send the transport plan to the vehicle; the automatic oiling system of the vehicle is configured to receive the transport plan from the transport planning system; according to the transport plan, prompt the vehicle to stop at the highway port to be stopped at and perform loading and/or unloading of cargo according to the cargo quantity to be loaded at the stopped-at highway port; and send information of the oil mass to be filled at the stopped-at highway port to the oiling device within the highway port; the oiling device is configured to receive the information of the oil mass to be filled from the long-distance transport vehicle; and fill oil fuel to the vehicle according to the information of the oil mass to be filled.

BRIEF DESCRIPTION OF THE DRAWINGS

The accompanying drawings are used to provide the further understanding of the invention and constitute a part of the specification, and serve to explain the invention together with the embodiments of the invention but not limit the invention.

DETAILED DESCRIPTION OF THE EMBODIMENTS

In order to make those skilled in the art better understand the technical solution in the invention, the technical solution in the embodiments of the invention will be described clearly and completely below in combination with the accompanying drawings in the embodiments of the invention. Obviously the described embodiments are just a part of the embodiments of the invention but not all the embodiments. Based upon the embodiments of the invention, all of other embodiments obtained by those ordinary skilled in the art without creative work should pertain to the protection scope of the invention.

In the embodiments of the invention, in order to solve the problem that the filled oil mass of the long-distance transport vehicle cannot be planned effectively in the prior art, the present application in combination with the self-driving technology, highway port technology and Internet of things technology provides an automatic oiling technology of long-distance transport vehicles, which can effectively plan the highway ports to be stopped at on a transport route, and the cargo quantity to be loaded and the oil mass to be filled at each highway port to be stopped at, so that the loaded cargo quantity and the filled oil mass of the long-distance transport vehicle achieve a reasonable proportion.

According to the method, device and system for automatic oiling of the long-distance transport vehicle provided by the present application, the transport planning system at the network side generates a transport plan for the long-distance transport vehicle according to vehicle status information, transport mission information and highway port information of the vehicle, where the transport plan includes at least one highway port to be stopped at by the vehicle, and the cargo quantity to be loaded at the highway port to be stopped at and the oil mass to be filled at the highway port to be stopped at; according to the transport plan, the long-distance transport vehicle stops at the highway port to be stopped at, performs loading and/or unloading of cargo according to the cargo quantity to be loaded at the stopped-at highway port, and sends the information of the oil mass to be filled at the stopped-at highway port to the oiling device within the highway port; and the oiling device delivers the oil fuel to the vehicle according to the information of the oil mass to be filled, which can achieve the effectively automatic oiling of the long-distance transport vehicle, so as to solve the problem that the filled oil mass of the long-distance transport vehicle cannot be planned effectively in the prior art.

Figure 1:
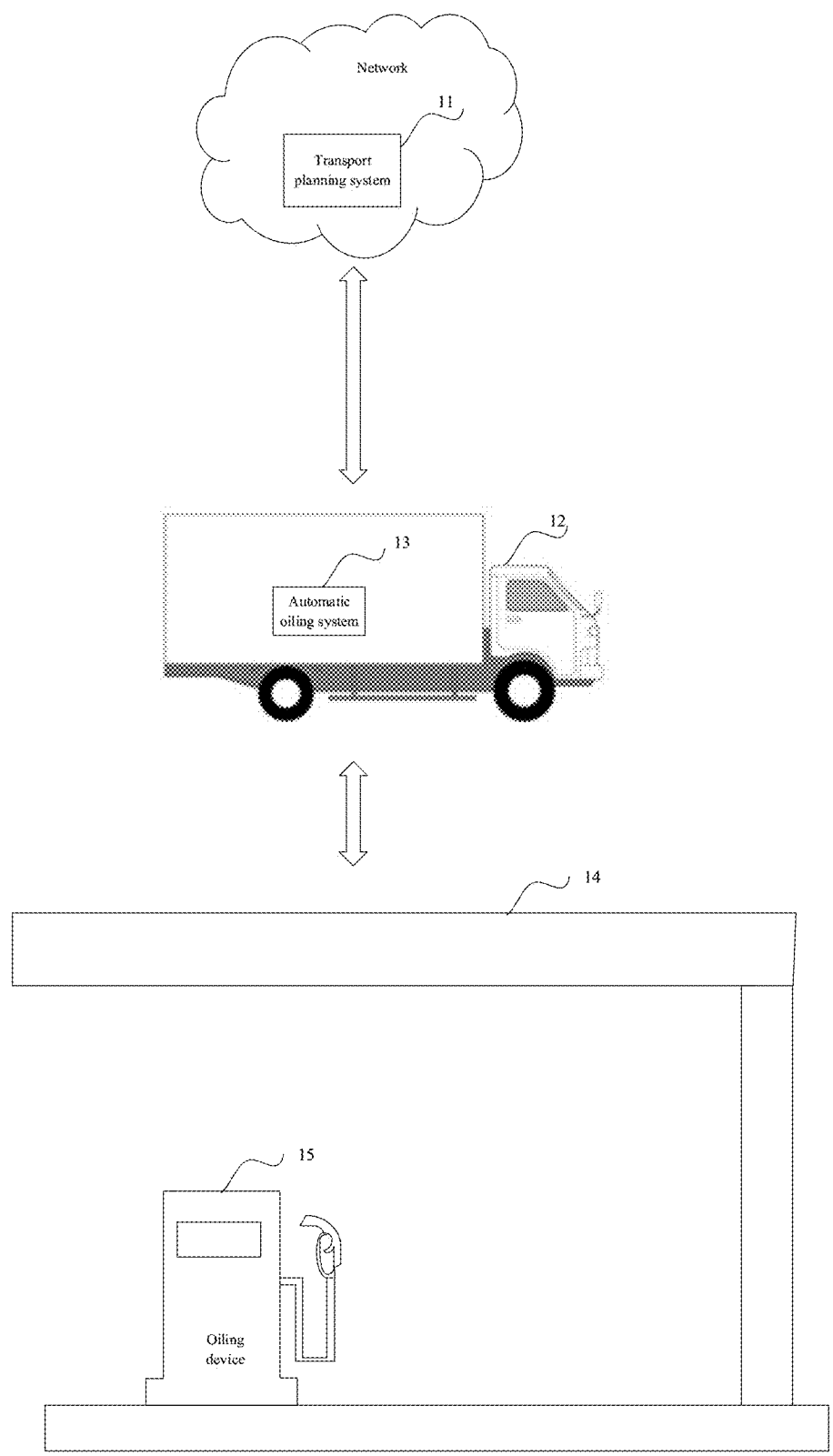
FIG. 1 is a schematic diagram of a system for automatic oiling of a long-distance transport vehicle provided by some embodiments of the present application.

As shown in FIG. 1, some embodiments of the present application provide a system for automatic oiling of a long-distance transport vehicle, which includes a transport planning system 11 at the network side, an automatic oiling system 13 on the vehicle 12 and an oiling device 15 within a highway port 14.

Here the transport planning system 11 can be located in an independent operation center, or can be located in an operation center set in combination with the highway port 14. The transport planning system 11 can access and read the data or the information stored in the highway port network, or can access and read the information in the on-board network, logistics network, Internet of vehicles and other networks. The operation center 16 can establish wired or wireless communications with the highway port networks, logistics networks, Internet of vehicles and other networks.

The long-distance transport vehicle 12 can carry out wired or wireless communications with the transport planning system 11, highway port networks, logistics networks, vehicle-carried network and other networks by a vehicle-carried communication device.

The oiling device 15 located within the highway port 14 can be configured with an onboard communication device, and carry out wired or wireless communications with the highway port networks, long-distance transport vehicle 12 and other network resources or entities by the onboard communication device.

The working principle of the system as shown in FIG. 1 includes:

the transport planning system 11 obtains vehicle status information, transport mission information and highway port information of the vehicle before the vehicle 12 starts from a highway port of departure; generates a transport plan according to the vehicle status information, the transport mission information and the highway port information, where the transport plan comprises at least one highway port to be stopped at, and cargo quantity to be loaded at each highway port to be stopped at and oil mass to be filled at each highway port to be stopped at; and sends the transport plan to the vehicle 12;

the automatic oiling system 13 of the vehicle 12 receives the transport plan from the transport planning system 11; according to the transport plan, prompts the vehicle to stop at the highway port to be stopped at and perform loading and/or unloading of cargo according to the cargo quantity to be loaded at the stopped-at highway port; and sends information of the oil mass to be filled at the stopped-at highway port to the oiling device 15 within the highway port 14; and the oiling device 15 receives the information of the oil mass to be filled from the long-distance transport vehicle 12; and fills oil fuel to the vehicle 12 according to the information of the oil mass to be filled.

The operating principles of the transport planning system 11, the automatic oiling system 13 of the vehicle and the oiling device 15 within the highway port in FIG. 1 will be illustrated below in details respectively.

Figure 2:
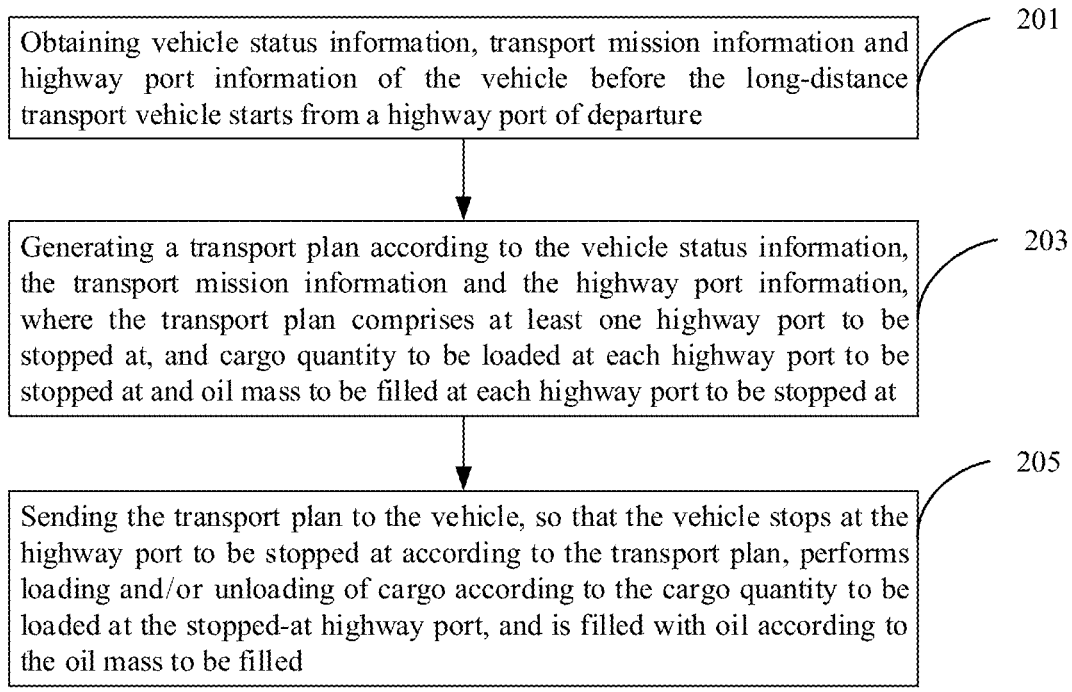
FIG. 2 is a flow chart of a method for automatic oiling of a long-distance transport vehicle provided by some embodiments of the present application.

FIG. 2 shows a flow chart of a method for automatic oiling of a long-distance transport vehicle in a plurality of embodiments. This method is applied in the transport planning system at the network side and includes:

Step 201: obtaining vehicle status information, transport mission information and highway port information of the vehicle before the long-distance transport vehicle starts from a highway port of departure.

The transport planning system can obtain the vehicle status information by a variety of different methods. In some embodiments, the transport planning system sends a request of obtaining the vehicle status information of the vehicle to the on-board network of the vehicle, the on-board network sends the vehicle status information of the vehicle to the transport planning system in response to the request, and the transport planning system receives the vehicle status information; in other embodiments, the on-board network sends the vehicle status information of the vehicle to the transport planning system in a predetermined period, the transport planning system receives the information and then stores the information locally, and the transport planning system reads the vehicle status information stored locally when it needs to obtain the vehicle status information of the vehicle. In some other embodiments, the vehicle status information can also be obtained by other methods.

The vehicle status information at least includes: average fuel consumption per 100 kilometers, dead-weight, maximum load, oil tank capacity and filled oil mass of the vehicle. The vehicle status information can further comprise other information. Where the average fuel consumption per 100 kilometers of the vehicle can be determined according to the empirical value of historical data, or can be determined according to the theoretical value, or can be determined according to both the empirical value and the theoretical value together.

The transport mission information can be collected manually in real time and input into the transport planning system, or can be pre-stored in the transport planning system. The transport mission information comprises information of a transport route which comprises a plurality of transport points, e.g., a transport point of departure, a transport point of destination and passing points. The transport mission information may further comprise information of the cargo quantity to be loaded at the at least one transport point. The transport planning system can obtain the highway port information from the highway port networks in advance and store it in the transport planning system locally. The highway port information comprises at least one of: identities of the highway ports, positions of the highway ports, in-port readiness position, in-port oiling position, in-port weighing position, in-port entry position, in-port exiting position, and other information. The above information is the static information of the highway port and relatively fixed once collected. The information is updated only when it changes, and synchronized into the transport planning system.

Step 203: generating a transport plan according to the vehicle status information, the transport mission information and the highway port information, where the transport plan comprises at least one highway port to be stopped at, and cargo quantity to be loaded at each highway port to be stopped at and oil mass to be filled at each highway port to be stopped at.

In an embodiment, the transport plan can be generated according to the following steps, which includes:

Step 2031: determining at least one available highway port corresponding to the transport points as the highway port(s) to be stopped at according to the information of the transport route in the transport mission information and the highway port information; where, the available highway port is the highway port in operation and supplying service;

for example, on a transport route, the starting point is city A, cities B and C are passing points, and the end point is city C, where each city corresponds to at least one available highway port; and for each transport point, at least one corresponding highway port can be determined as the highway port(s) to be stopped at;

Step 2032: determining the cargo quantity at each highway port to be stopped at according to the information of the cargo quantity to be loaded at the at least one transport point and the highway ports to be stopped at;

Step 2033: determining the oil mass to be filled at each highway port to be stopped at according to a function relationship among the vehicle status information, the cargo quantity at each highway port to be stopped at and a position of each highway port to be stopped at.

In some embodiments, at least one piece of information included in the vehicle status information or the result of processing many pieces of information, the cargo quantity to be loaded at the highway port to be stopped at, and the position of each highway port to be stopped at are taken as variables, and the oil mass to be filled at the highway port to be stopped at is determined according to a function relationship among these variables. The function relationship can be expressed as $y=f(r, s, t)$, wherein y is the oil mass to be filled, r is one piece of information or the result of processing many pieces of information in the vehicle status information, s is the cargo quantity at the highway port to be stopped at, and t is the distance between two adjacent highway ports to be stopped at and can be obtained according to the positions of the two adjacent highway ports to be stopped at.

The function relationship can be set according to the requirements of the practical application scenario. It can be understood that the function relationship can further include other variables, e.g., driving resistance or the like.

For different vehicles, different transport missions and different highway port information, the oil mass to be filled can be obtained according to the function relationship when the different vehicles carry out the different transport missions.

The transport planning system can determine the above function relationship in many different ways. In some embodiments, the method of deep learning can be used to perform a training on a neural network model to obtain an function relationship model, and the transport plan is generated according to the input vehicle status information, transport mission information and highway port information based on the model; in some other embodiments, the function relationship model can be established by other methods, and the transport plan is generated by using the established model.

Moreover, in order to achieve the more effective and accurate planning, the transport plan can further includes at least one of: cargo loading and/or unloading information, in-port readiness time, in-port readiness position, in-port oiling time, in-port oiling position, in-port weighing time, in-port weighing position, in-port departure time, in-port departure position and other information of the vehicle at each highway port to be stopped at. For the vehicle with the self-driving function or intelligent driving function, the use of these information can effectively help the vehicle to drive into, stop at and drive out of the highway port, and effectively assist in the cargo loading. The one piece of information or the result of processing many pieces of information described above can also be taken as variables and added to the function relationship of determining the oil mass to be filled. The oil mass to be filled is determined according to more variables to achieve the more effectively automatic oiling. The specific application scenario can be set according to the actual scene, and is not described in detail here.

Step 205: sending the transport plan to the vehicle, so that the vehicle stops at the highway port to be stopped at according to the transport plan, performs loading and/or unloading of cargo according to the cargo quantity to be loaded at the stopped-at highway port, and is filled with oil according to the oil mass to be filled.

With the method as shown in FIG. 2, for the long-distance transport vehicle, the transport planning system can plan the highway ports to be stopped at, and the loaded cargo quantity and the filled oil mass at the highway ports to be stopped at; and the long-distance transport vehicle can achieve the automatic and effective oiling by implementing this transport plan.

In the method as shown in FIG. 2, the information obtained by the transport planning system for generating the transport plan is essentially the static information. The transport plan generated according to the static information is reliable and effective in case of no obvious change of the traffic condition. But the long-distance transport has the characteristics of long distance, more weather changes, and more sudden changes in road conditions. If the transport plan is generated according to only the static information, the long-distance transport may be affected. In another embodiment of the present application, in order to achieve the more effectively and accurately automatic oiling of the long-distance transport vehicle, the transport planning system can further obtain dynamic transport route condition information and generate the transport plan adaptable to multiple dynamic changes according to the dynamic transport route condition information as well as the vehicle status information, transport mission information and highway port information of the vehicle.

Figure 3:
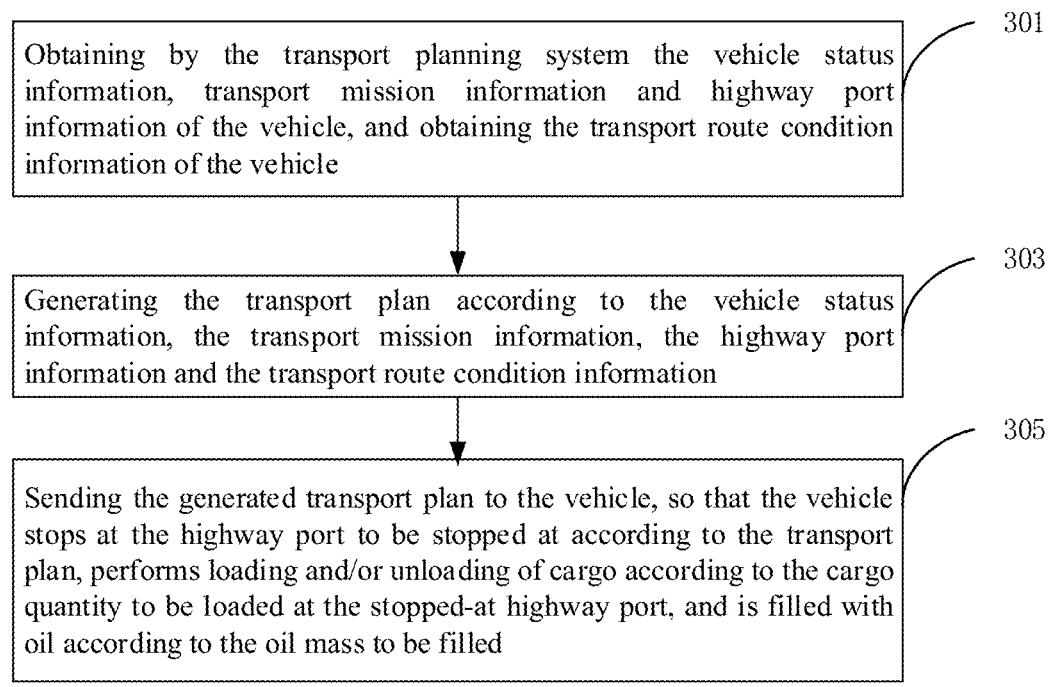
FIG. 3 is a flow chart of a method for automatic oiling of a long-distance transport vehicle provided by some embodiments of the present application.

As shown in FIG. 3, the method for automatic oiling of the long-distance transport vehicle provided by the present application further includes the following steps:

Step 301: obtaining by the transport planning system the vehicle status information, transport mission information and highway port information of the vehicle, and obtaining the transport route condition information of the vehicle.

The transport route condition information includes at least one of: weather information of the transport route, roadway condition information of the transport route, roadway congestion information of the transport route, operational status information of highway ports of the transport route; the roadway condition information includes at least one of: dry/wet condition information of road surface, roadway speed limit information, roadway traffic control information, roadway closure information; and the operational information of highway ports includes at least one of: congestion condition information of in-port vehicles, in-port scheduling time information, port closure information of the highway ports.

The method of obtaining the vehicle status information, transport mission information and highway port information of the vehicle is described as the method as shown in FIG. 2, and will not be repeated here.

The weather information of the transport route can be obtained by the weather forecast, the roadway condition information can be obtained by collecting and storing the roadway condition in advance, the roadway congestion information can be obtained by instant traffic reports, and the operational status information of highway ports can be obtained by the highway port networks.

Step 303: generating the transport plan according to the vehicle status information, the transport mission information, the highway port information and the transport route condition information.

The method of determining the highway port to be stopped at and the cargo quantity to be loaded at the highway port to be stopped at in the transport plan can be described as the above steps 2031 to 2032, and will not be repeated here.

The method of determining the oil mass to be filled at the highway port to be stopped in the transport plan includes: determining the oil mass to be filled at the highway port to be stopped at according to a function relationship among the vehicle status information, the cargo quantity at each highway port to be stopped at, the position of each highway port to be stopped at and the transport route condition information.

On basis of the above step 2033, when determining the oil mass to be filled at the highway port to be stopped at, one piece of information or the result of processing many pieces of information in the transport route condition information can be taken as a new variable in the function of determining the oil mass to be filled, that is, the function relationship in the above step 2033 can further be expressed as $y=f(r, s, t, u)$, wherein y is the oil mass to be filled, r is one piece of information or the result of processing many pieces of information in the vehicle status information, s is the cargo quantity at the highway port to be stopped at, t is the distance between two adjacent highway ports to be stopped at, and u is one piece of information or the result of processing many pieces of information in the transport route condition information.

For example, the weather information of the transport route is taken as a variable, and this variable itself or the weighted variable is added to the function of determining the oil mass to be filled, so as to determining the oil mass to be filled through multiple variables. Also many pieces of information in the transport route condition information can firstly be processed to obtain a variable, where the processing can also be implemented by a function. The new variable itself or the weighted variable is added to the function of determining the oil mass to be filled and the oil mass to be filled is determined according to this function.

Step 305: sending the generated transport plan to the vehicle, so that the vehicle stops at the highway port to be stopped at according to the transport plan, performs loading and/or unloading of cargo according to the cargo quantity to be loaded at the stopped-at highway port, and is filled with oil according to the oil mass to be filled.

With the method as shown in FIG. 3, the transport planning system can generate the transport plan according to the static information and dynamic information, so as to achieve the automatic oiling of the long-distance transport vehicle more effectively and accurately.

Further, as described above, the long-distance transport has the characteristics of long distance and more dynamic changes of road conditions. An embodiment of the present application further provides a method for automatic oiling of a long-distance transport vehicle, by which the transport route condition information of the transport route to be driven can be updated and the filled oil mass corresponding to the highway ports in the transport route to be driven in the transport plan can be updated, so as to achieve the automatic oiling of the long-distance transport vehicle more effectively and accurately.

Figure 4:
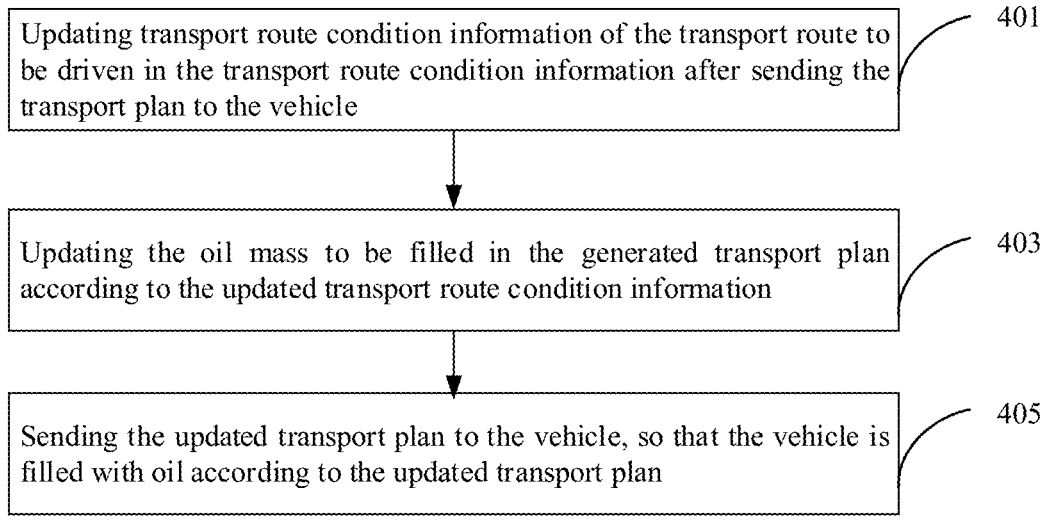
FIG. 4 is a flow chart of a method for automatic oiling of a long-distance transport vehicle provided by some embodiments of the present application.

FIG. 4 shows another method for automatic oiling of a long-distance transport vehicle provided by embodiments of the present application. This method can be used as the subsequent processing method of the method as shown in FIG. 3, and includes the following processing flow:

Step 401: updating transport route condition information of the transport route to be driven in the transport route condition information after sending the transport plan to the vehicle.

The transport planning system can update the transport route condition information in many ways. In some embodiments of the present application, the condition information of the transport route to be driven can be obtained in a predetermined period, and the transport route condition information is updated when any item in the obtain condition information is updated; in some other embodiments of the present application, the transport route condition information is updated when the update information of any item in condition information of the transport route to be driven is obtained in real time. In some other embodiments of the present application, the two update modes described above can also be used to update the transport route condition information.

Step 403: updating the oil mass to be filled in the generated transport plan according to the updated transport route condition information.

When the transport route condition information of the transport route to be driven is updated, the filled oil mass corresponding to the transport route to be driven in the transport plan is also updated accordingly.

Step 405: sending the updated transport plan to the vehicle, so that the vehicle is filled with oil according to the updated transport plan.

With the method as shown in FIG. 4, the long-distance transport vehicle can receive the updated transport plan during the transportation, where the transport plan includes the filled oil mass adjusted according to dynamic changes, so as to achieve the automatic oiling of the long-distance transport vehicle more effectively and accurately.

The working principle of the transport planning system at the network side is illustrated above. The working principle of the automatic oiling system of the long-distance transport vehicle will be illustrated below.

Figure 5:
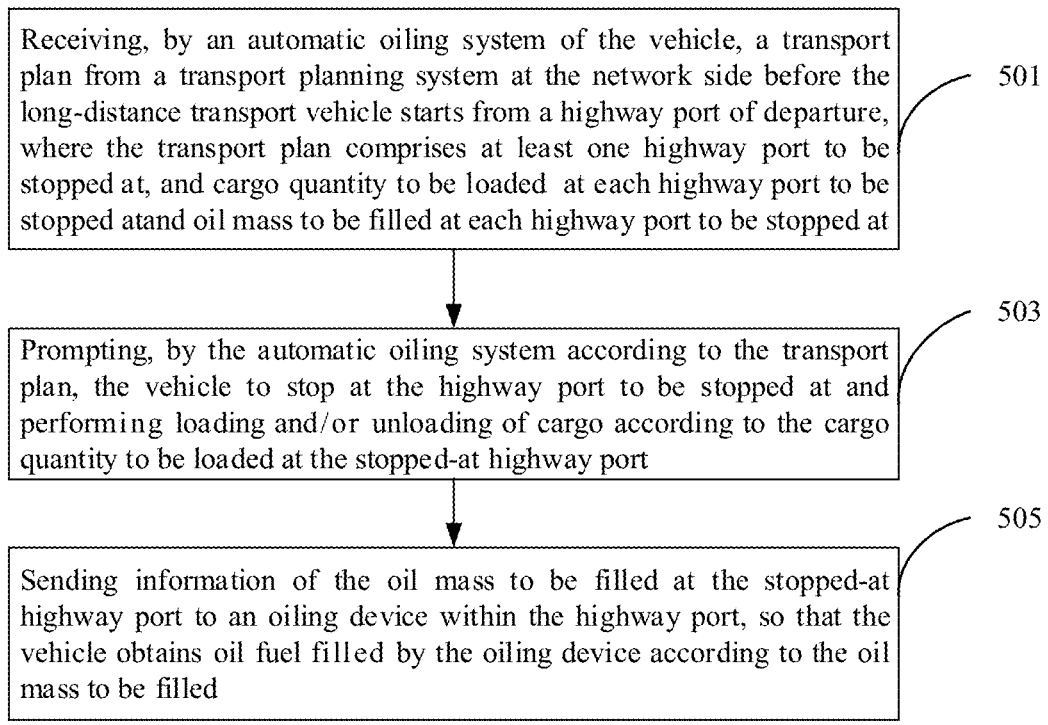
FIG. 5 is a flow chart of a method for automatic oiling of a long-distance transport vehicle provided by some embodiments of the present application.

FIG. 5 shows a method for automatic oiling of a long-distance transport vehicle provided by embodiments of the present application. This method is applied in the automatic oiling system of the long-distance transport vehicle and includes the following processing flow:

Step 501: receiving, by an automatic oiling system of the vehicle, a transport plan from a transport planning system at the network side before the long-distance transport vehicle starts from a highway port of departure, where the transport plan includes at least one highway port to be stopped at, and cargo quantity to be loaded at each highway port to be stopped at and oil mass to be filled at each highway port to be stopped at.

The automatic oiling system can receive the transport plan by an on-board communication device of the vehicle.

Step 503: prompting, by the automatic oiling system according to the transport plan, the vehicle to stop at the highway port to be stopped at and performing loading and/or unloading of cargo according to the cargo quantity to be loaded at the stopped-at highway port.

Step 505: sending information of the oil mass to be filled at the stopped-at highway port to an oiling device within the highway port, so that the vehicle obtains oil fuel filled by the oiling device according to the oil mass to be filled.

The automatic oiling system can send the information of the oil mass to be filled to the oiling device by the on-board communication device of the vehicle.

With the method as shown in FIG. 5, the long-distance transport vehicle can communicate with the oiling device within the highway port, send the oil mass to be filled corresponding to the highway port to the oiling device and obtain the oil fuel delivered by the oiling device according to the transport plan from the transport planning system at the network side, so as to achieve the automatic oiling of the long-distance transport vehicle.

Figure 6:
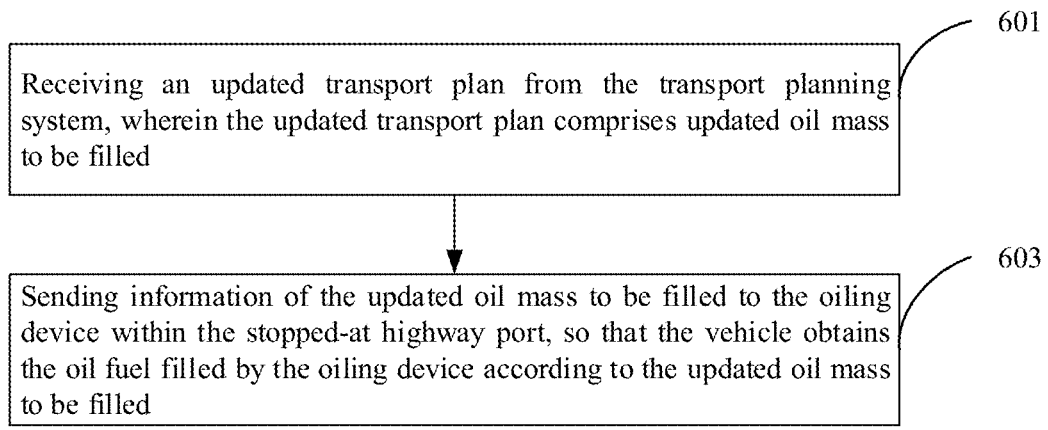
FIG. 6 is a flow chart of a method for automatic oiling of a long-distance transport vehicle provided by some embodiments of the present application.

Further, the method as shown in FIG. 4 provides a scheme of updating the transport plan of the transport route to be driven automatically at the network side. Accordingly, in some embodiments of the present application, FIG. 6 shows a method of implementing the automatic oiling by the long-distance transport vehicle according to the updated transport plan. This method can be used as the subsequent processing method of the method as shown in FIG. 5, and includes the following processing flow:

Step 601: receiving an updated transport plan from the transport planning system, wherein the updated transport plan comprises updated oil mass to be filled.

Step 603: sending information of the updated oil mass to be filled to the oiling device within the stopped-at highway port, so that the vehicle obtains the oil fuel delivered by the oiling device according to the updated oil mass to be filled.

With the method as shown in FIG. 6, the updated transport plan can be obtained dynamically to achieve the more effectively and accurately automatic oiling of the long-distance transport vehicle.

Further, both the cargo quantity to be loaded and the oil mass to be filled in the transport plan are estimated values, and the cargo loading condition of the long-distance transport vehicle may change during the long-distance driving, so that there may be a deviation between the actually-loaded cargo quantity of the vehicle and the loaded cargo quantity estimated at the network side. For this case, some embodiments of the present application provide a method in which the automatic oiling system of the vehicle determines the actual oil mass to be filled according to the contrast relations between the actually-loaded cargo quantity of the vehicle and the loaded cargo quantity estimated at the network side and between the actually-filled oil mass of the vehicle and the oil mass to be filled.

Figure 7:
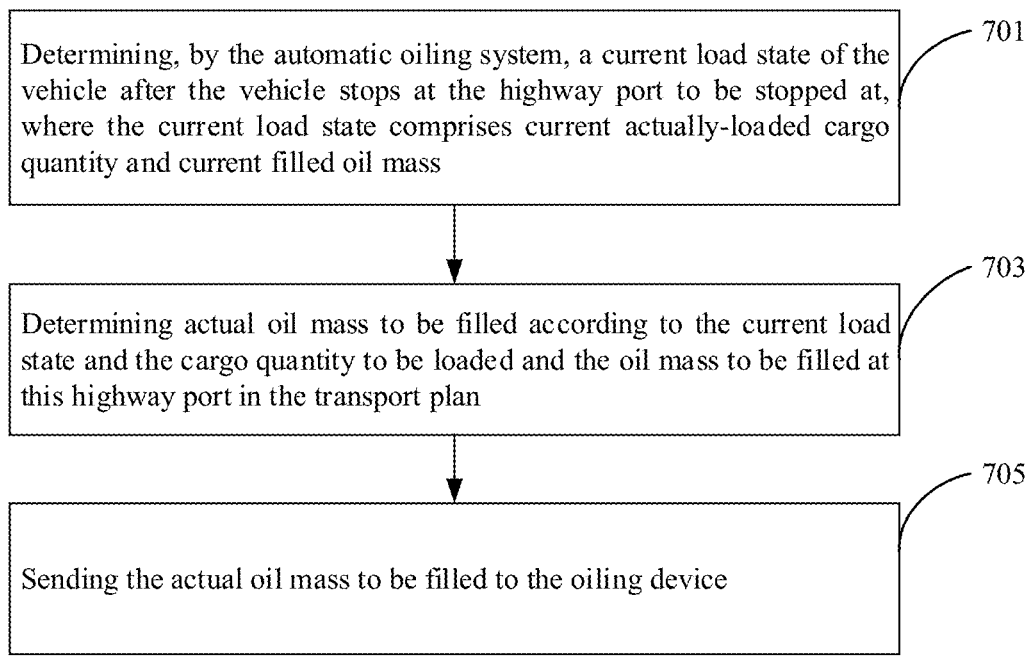
FIG. 7 is a flow chart of a method for automatic oiling of a long-distance transport vehicle provided by some embodiments of the present application.

FIG. 7 shows a method for automatic oiling of a long-distance transport vehicle provided by embodiments of the present application. This method includes the following processing flow:

Step 701: determining, by the automatic oiling system, a current load state of the vehicle after the vehicle stops at the highway port to be stopped at, where the current load state comprises current actually-loaded cargo quantity and current filled oil mass.

In some embodiments, the automatic oiling system can invoke an on-board load sensor of the vehicle to obtain information from the on-board load sensor, and determine the current actually-loaded cargo quantity of the vehicle.

In some embodiments, the automatic oiling system can invoke an oil tank liquid level sensor of the vehicle to obtain information from the oil tank liquid level sensor, and determine the current filled oil mass of the vehicle.

Step 703: determining actual oil mass to be filled according to the current load state and the cargo quantity to be loaded and the oil mass to be filled at this highway port in the transport plan.

In some embodiments, the automatic oiling system can compare the current actually-loaded cargo quantity with the cargo quantity to be loaded, and the current filled oil mass with the oil mass to be filled; determine a correction value of the oil mass to be filled according to comparison results; and determine the actual oil mass to be filled according to the correction value and the oil mass to be filled.

Step 705: sending the actual oil mass to be filled to the oiling device.

With the method as shown in FIG. 7, the automatic oiling system of the vehicle can correct the oil mass to be filled in the transport plan according to the actual load condition and the actual filled oil condition of the vehicle, so as to achieve the effectively and accurately automatic oiling of the long-distance transport vehicle.

Some embodiments of the present application further provide a payment scheme by which the automatic oiling system of the vehicle makes a payment for the oil fuel filled by the oiling device.

Figure 8:
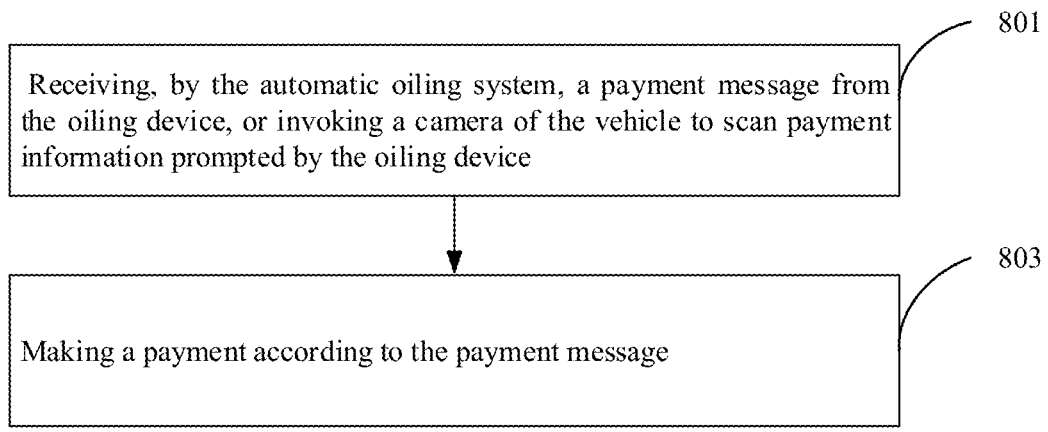
FIG. 8 is a flow chart of a payment method for automatic oiling of a long-distance transport vehicle provided by some embodiments of the present application.

FIG. 8 shows a payment method for automatic oiling of a long-distance transport vehicle provided by embodiments of the present application. This method can be used as the subsequent processing method of any one of methods as shown in FIGS. 5 to 7, and includes the following processing flow:

Step 801: receiving, by the automatic oiling system, a payment message from the oiling device, or invoking a camera of the vehicle to scan payment information prompted by the oiling device.

Specifically the automatic oiling system can receive the payment message or invoke the camera of the vehicle to scan the payment information before, when or after obtaining the oil fuel delivered by the oiling device.

Step 803: making a payment according to the payment message.

Specifically the automatic oiling system can making the payment by the built-in payment processing function.

With the above processing method, the automatic oiling system of the vehicle can communicate with the transport planning system at the network side and the oiling device, send the information of the oil mass to be filled in the transport plan from the transport planning system to the oiling device, and obtain the oil fuel delivered by the oiling device, so as to achieve the automatic oiling of the long-distance transport vehicle.

The working principle of the oiling device within the highway port will be illustrated below.

Figure 9:
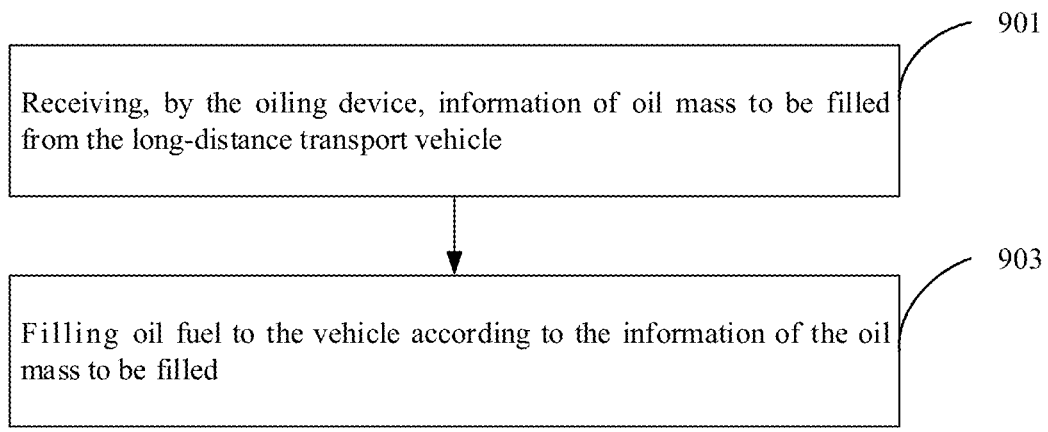
FIG. 9 is a flow chart of a method for automatic oiling of a long-distance transport vehicle provided by some embodiments of the present application.

FIG. 9 shows a method for automatic oiling of a long-distance transport vehicle provided by embodiments of the present application. This method is applied on the oiling device and includes the following processing flow:

Step 901: receiving, by the oiling device, information of oil mass to be filled from the long-distance transport vehicle.

Specifically the information of oil mass to be filled can be received by the on-board communication device;

Step 903: filling oil fuel to the vehicle according to the information of the oil mass to be filled.

Moreover, on basis of the above processing flow, the oiling device can further generate the payment information according to the information of the oil mass to be filled, and send a message comprising the payment information or prompt the payment information to the vehicle, to enable the vehicle to make a payment. Here the payment information can be sent to the vehicle by the on-board communication device.

With the above methods provided by the embodiments of the present application, the transport planning system at the network side generates a transport plan for the long-distance transport vehicle, where the transport plan includes at least one highway port to be stopped and the cargo quantity to be loaded and the oil mass to be filled at the highway port to be stopped at; the vehicle carries out the transportation according to the transport plan, stops at the highway port to be stopped at, performs loading and/or unloading of cargo according to the cargo quantity to be loaded at the stopped-at highway port, and sends the information of the oil mass to be filled to the oiling device within the stopped-at highway port; and the oiling device fills the oil fuel to the vehicle according to the information of the oil mass to be filled, so as to achieve the automatic oiling of the long-distance transport vehicle.

Figure 10:
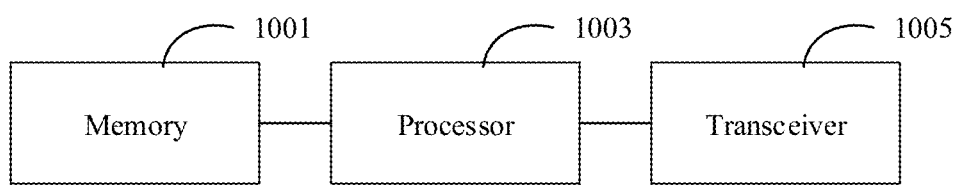
FIG. 10 is a structural schematic diagram of a device for automatic oiling of a long-distance transport vehicle provided by some embodiments of the present application.

Embodiments of the present application further provides a device for automatic oiling of a long-distance transport vehicle, where the device is at the network side and can implement the functions of the transport planning system as shown in FIG. 1. As shown in FIG. 10, the device includes: a memory 1001, a processor 1003 and a transceiver 1005.

The memory 1001 is configured to store at least one machine executable instruction.

The processor 1003 is configured to execute the instruction stored in the memory 1001 to: obtain vehicle status information, transport mission information and highway port information of the vehicle; generate a transport plan according to the vehicle status information, the transport mission information and the highway port information, wherein the transport plan includes at least one highway port to be stopped at, and cargo quantity to be loaded at each highway port to be stopped at and oil mass to be filled at each highway port to be stopped at; and send, by the transceiver, the transport plan to the vehicle, so that the vehicle stops at the highway port to be stopped at according to the transport plan, performs loading and/or unloading of cargo according to the cargo quantity to be loaded at the stopped-at highway port, and is filled with oil according to the oil mass to be filled at the stopped-at highway port.

The transceiver 1005 is configured to receive and send information according to invoking by the processor 1003.

In some embodiments, the processor 1003 executes the instruction to obtain the vehicle status information which includes: send by the transceiver 1005 a request of obtaining the vehicle status information of the vehicle to the on-board network of the vehicle, and receive by the transceiver the vehicle status information of the vehicle fed back from the on-board network of the vehicle; or obtain the vehicle status information of the vehicle locally pre-stored in the memory 1001 and sent by the on-board network in a predetermined period.

In some embodiments, the vehicle status information at least includes: average fuel consumption per 100 kilometers, dead-weight, maximum load, oil tank capacity and filled oil mass of the vehicle; the transport mission information at least comprises: information of a transport route including a plurality of transport points, and information of cargo quantity to be loaded at the at least one of the transport points, wherein the transport points comprise a transport point of departure, a transport point of destination and passing points; the highway port information at least comprises: identity and location information of at least one available highway port; then the processor executes the instruction to generate the transport plan, which includes: determine at least one available highway port corresponding to the transport points as highway port(s) to be stopped at according to the information of the transport route in the transport mission information and the highway port information; determine the cargo quantity at each highway port to be stopped at according to the information of the cargo quantity to be loaded at the at least one of the transport point and the highway ports to be stopped at; determine the oil mass to be filled at each highway port to be stopped at according to a function relationship among the vehicle status information, the cargo quantity at each highway port to be stopped at and a position of each highway port to be stopped at.

In some embodiments, the processor 1003 executes the instruction to further obtain transport route condition information of the vehicle, where the transport route condition information comprises at least one of: weather information of the transport route, roadway condition information of the transport route, roadway congestion information of the transport route, operational status information of highway ports of the transport route; then the processor 1003 executes the instruction to generate the transport plan, which includes: determine the oil mass to be filled at each highway port to be stopped at according to a function relationship among the vehicle status information, the cargo quantity at each highway port to be stopped at, the position of each highway port to be stopped at and the transport route condition information.

In some embodiments, the processor 1003 executes the instruction to send the transport plan to the vehicle and then further to: update transport route condition information of the transport route to be driven in the transport route condition information; update the oil mass to be filled in the generated transport plan according to the updated transport route condition information; and send the updated transport plan by the transceiver to the vehicle.

In some embodiments, the processor 1003 executes the instruction to update transport route condition information of the transport route to be driven in the transport route condition information, which includes: obtain condition information of the transport route to be driven in a predetermined period, and update the transport route condition information when any item in the obtain condition information is updated; and/or update the transport route condition information when obtaining update information of any item in condition information of the transport route to be driven in real time.

Figure 11:
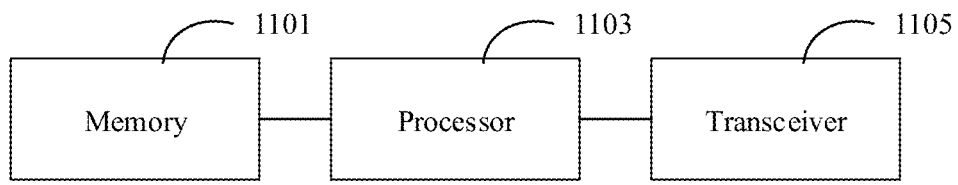
FIG. 11 is a structural schematic diagram of a device for automatic oiling of a long-distance transport vehicle provided by some embodiments of the present application.

Embodiments of the present application further provides a device for automatic oiling of a long-distance transport vehicle, where the device is within the long-distance transport vehicle and can implement the functions of the automatic oiling system as shown in FIG. 1. As shown in FIG. 11, the device includes: a memory 1101, a processor 1103 and a transceiver 1105.

The memory 1101 is configured to store at least one machine executable instruction.

The processor 1103 is configured to execute the instruction stored in the memory 1101 to: receive, by the transceiver 1105, a transport plan from an automatic oiling device at a network side, where the transport plan includes at least one highway port to be stopped at, and cargo quantity to be loaded at each highway port to be stopped at and oil mass to be filled at each highway port to be stopped at; according to the transport plan, prompt the vehicle to stop at the highway port to be stopped at and perform loading and/or unloading of cargo according to the cargo quantity to be loaded at the stopped-at highway port; and send, by invoking transceiver 1105, information of the oil mass to be filled at the stopped-at highway port to an oiling device within the highway port, so that the vehicle obtains oil fuel delivered by the oiling device according to the oil mass to be filled.

The transceiver 1105 is configured to receive and send information according to invoking by the processor.

In some embodiments, the processor 1103 further executes the instruction to: receive, by the transceiver 1105, an updated transport plan from the automatic oiling device (i.e., transport planning system) at the network side, where the updated transport plan comprises updated oil mass to be filled; then the processor 1103 executes the instruction to send the information of the oil mass to be filled to the oiling device within the stopped-at highway port, which includes: send the information of the updated oil mass to be filled to the oiling device within the stopped-at highway port.

In some embodiments, the processor 1103 further executes the instruction to: determine the current load state of the vehicle after the vehicle stops at the highway port to be stopped at, where the current load state comprises the current actually-loaded cargo quantity and the current filled oil mass; and determine the actual oil mass to be filled according to the current load state and the cargo quantity to be loaded and the oil mass to be filled at this highway port in the transport plan; then the processor 1103 executes the instruction to send the information of the oil mass to be filled to the oiling device within the stopped-at highway port, which includes: send the actual oil mass to be filled to the oiling device.

In some embodiments, the processor 1103 executes the instruction to determine the oil mass to be filled, which includes: compare the current actually-loaded cargo quantity with the cargo quantity to be loaded, and the current filled oil mass with the oil mass to be filled; determine a correction value of the oil mass to be filled according to comparison results; and determine the actual oil mass to be filled according to the correction value and the oil mass to be filled.

In some embodiments, the processor 1103 executes the instruction to determine the current load state of the vehicle, which includes: obtain information from an on-board load sensor, and determine the current actually-loaded cargo quantity of the vehicle; obtain information from oil tank liquid level sensor of the vehicle, and determine the current filled oil mass of the vehicle.

In some embodiments, the processor 1103 executes the instruction to further: receive a payment message from the oiling device, or invoke a camera of the vehicle to scan the payment information prompted by the oiling device; and make a payment according to the payment message.

Figure 12:
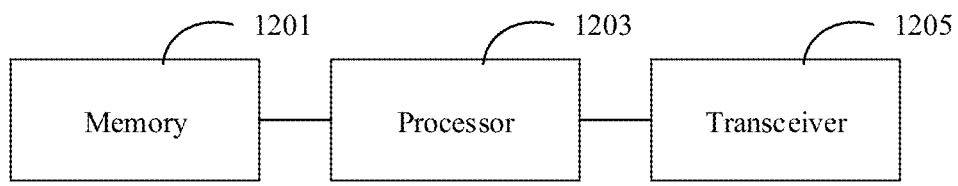
FIG. 12 is a structural schematic diagram of a device for automatic oiling of a long-distance transport vehicle provided by some embodiments of the present application.

Embodiments of the present application further provides a device for automatic oiling of a long-distance transport vehicle, where the device is within an oiling device and can implement the functions of the oiling device as shown in FIG. 1. As shown in FIG. 12, the device includes: a memory 1201, a processor 1203 and a transceiver 1205.

The memory 1201 is configured to store at least one machine executable instruction.

The processor 1203 is configured to execute the instruction stored in the memory 1201 to: receive, by the transceiver 1205, information of oil mass to be filled from the long-distance transport vehicle; and fill oil fuel to the vehicle according to the information of the oil mass to be filled.

The transceiver 1205 is configured to receive and send information according to invoking by the processor 1203.

In some embodiments, the processor 1203 executes the instruction to further:

determine the payment information of the filled oil mass; and send or prompt the payment information to the vehicle.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A method for automatic oiling of a long-distance transport vehicle performed by a computer associated with a transport planning system, the method comprising:

obtaining vehicle status information, transport mission information, and highway port information of a vehicle before the vehicle starts from a highway port of departure,
- wherein the vehicle status information describes one or more characteristics of the vehicle,
- wherein the transport mission information indicates at least a transport route and information about cargo that is loaded or unloaded along the transport route, and
- wherein the highway port information indicates one or more highway ports along the transport route;

generating a transport plan according to the vehicle status information, the transport mission information, and the highway port information, wherein the transport plan comprises at least one highway port to be stopped at, cargo quantity to be loaded at each highway port to be stopped at, and oil mass to be filled at each highway port to be stopped at,
- wherein the generating comprises determining the oil mass to be filled at each highway port to be stopped at based on at least the vehicle status information, the cargo quantity at each highway port to be stopped at, and a position of each highway port to be stopped at; and sending the transport plan to another computer associated with the vehicle, wherein the transport plan is configured to prompt the vehicle to: stop at the highway port, perform loading and/or unloading of cargo according to the cargo quantity to be loaded at the stopped-at highway port, and fill with oil according to the oil mass to be filled at the stopped-at highway port.

2. The method according to claim 1, wherein obtaining the vehicle status information of the vehicle comprises:
sending a request of obtaining the vehicle status information of the vehicle to an on-board network of the vehicle, and receiving the vehicle status information of the vehicle fed back from the on-board network; or
obtaining the vehicle status information of the vehicle pre-stored locally and sent by the on-board network in a predetermined period.

3. The method according to claim 1, wherein when the vehicle status information at least comprises: average fuel consumption, dead-weight, maximum load, oil tank capacity or filled oil mass of the vehicle;
the transport mission information at least comprises: information of the transport route comprising a plurality of transport points, and information of cargo quantity to be loaded at the at least one of the transport points, wherein the transport points comprise a transport point of departure, a transport point of destination and passing points;
the highway port information at least comprises: identity and location information of at least one available highway port;
then
generating the transport plan according to the vehicle status information, the transport mission information and the highway port information, further comprises:
determining available highway ports corresponding to the transport points as highway ports to be stopped at according to the information of the transport route in the transport mission information and the highway port information; and
determining the cargo quantity at each highway port to be stopped at according to the information of the cargo quantity to be loaded at the at least one of the transport points and the highway ports to be stopped at.

4. The method according to claim 3, wherein the method further comprises:
obtaining transport route condition information of the vehicle, wherein the transport route condition information comprises at least one of: weather information of the transport route, roadway condition information of the transport route, roadway congestion information of the transport route, operational status information of highway ports of the transport route;
then generating the transport plan comprises:
determining the oil mass to be filled at each highway port to be stopped at according to a function relationship among the vehicle status information, the cargo quantity at each highway port to be stopped at, the position of each highway port to be stopped at and the transport route condition information.

5. The method according to claim 4, wherein after sending the transport plan to the vehicle, the method further comprises:
updating transport route condition information of the transport route to be driven in the transport route condition information;
updating the oil mass to be filled in the generated transport plan according to the updated transport route condition information; and
sending the updated transport plan to the vehicle, so that the vehicle is filled with oil according to the updated transport plan.

6. The method according to claim 5, wherein updating transport route condition information of the transport route to be driven in the transport route condition information comprises:
obtaining condition information of the transport route to be driven in a predetermined period, and updating the transport route condition information when any item in the obtain condition information is updated; and/or
updating the transport route condition information when obtaining update information of any item in condition information of the transport route to be driven in real time.

7. The method according to claim 4, wherein the roadway condition information comprises at least one of: dry/wet condition information of road surface, roadway speed limit information, roadway traffic control information, roadway closure information;
the operational status information of highway ports comprises at least one of: congestion condition information of in-port vehicles, in-port scheduling time information, port closure information of the highway ports.

8. The method according to claim 1, wherein the transport plan further comprises at least one of:
cargo loading and/or unloading information, in-port setup time, in-port setup position, in-port oiling time, in-port oiling position, in-port weighing time, in-port weighing position, in-port starting time, and in-port starting position of the vehicle at each highway port to be stopped at.

9. A method for automatic oiling of a vehicle performed by a computer for an automatic oiling system located in the vehicle, the method comprising:
receiving a transport plan from a transport planning system before the vehicle starts from a highway port of departure, wherein the transport plan comprises at least one highway port to be stopped at, and cargo quantity to be loaded at each highway port to be stopped at, and oil mass to be filled at each highway port to be stopped at;

prompting, according to the transport plan, the vehicle to stop at the highway port to be stopped at and to perform loading and/or unloading of cargo according to the cargo quantity to be loaded at the stopped-at highway port;

determining, based on information received from a load sensor and an oil tank liquid level sensor, a current load state of the vehicle after the vehicle stops at the highway port to be stopped at, wherein the load sensor and the oil tank liquid level sensor are located in the vehicle, and wherein the current load state comprises current actually-loaded cargo quantity received from the load sensor and current filled oil mass received from the oil tank liquid level sensor;

determining actual oil mass to be filled according to the current load state and the cargo quantity to be loaded and the oil mass to be filled at this highway port in the transport plan; and sending information of the actual oil mass to be filled at the stopped-at highway port to an oiling device within the highway port, wherein the oiling device is configured to deliver oil fuel to the vehicle according to the actual oil mass to be filled.

10. The method according to claim 9, wherein the method further comprises:

receiving an updated transport plan from the transport planning system, wherein the updated transport plan comprises updated oil mass to be filled.

11. The method according to claim 9, wherein determining the actual oil mass to be filled comprises:

comparing the current actually-loaded cargo quantity with the cargo quantity to be loaded, and the current filled oil mass with the oil mass to be filled;

determining a correction value of the oil mass to be filled according to comparison results; and determining the actual oil mass to be filled according to the correction value and the oil mass to be filled.

12. The method according to claim 9, wherein the method further comprises:

receiving, by the computer, a payment message from the oiling device, or invoking a camera of the vehicle to scan payment information prompted by the oiling device; and making a payment according to the payment message.

13. The method according to claim 9, wherein receiving the transport plan from the transport planning system comprises:

receiving, by an on-board communication device of the vehicle, the transport plan; and sending the information of the oil mass to be filled to the oiling device within the stopped-at highway port comprises:

sending, by the on-board communication device of the vehicle, the information of the oil mass to be filled to the oiling device.

14. A method for automatic oiling of a long-distance transport vehicle performed by a computer associated with an oiling device, the method comprising:

receiving, by a transceiver associated with the computer, information of oil mass to be filled from a vehicle;

delivering oil fuel to the vehicle according to the information of the oil mass to be filled;

determining payment information of the filled oil mass; and sending, to another computer associated with the vehicle, a message comprising the payment information, or prompting the payment information.

15. The method according to claim 14, wherein receiving the information of the oil mass to be filled from the vehicle comprises:

receiving, by an on-board communication device, the information of the oil mass to be filled; and sending the payment information to the vehicle comprises:

sending, by the on-board communication device, the payment information to the vehicle.

16. A device for automatic oiling of a long-distance transport vehicle, the device comprising a processor and a transceiver;

the processor is configured to:

obtain vehicle status information, transport mission information, and highway port information of a vehicle before the vehicle starts from a highway port of departure, wherein the vehicle status information describes one or more characteristics of the vehicle, wherein the transport mission information indicates at least a transport route and information about cargo that is loaded or unloaded along the transport route, and wherein the highway port information indicates one or more highway ports along the transport route;

generate a transport plan according to the vehicle status information, the transport mission information and the highway port information, wherein the transport plan comprises at least one highway port to be stopped at, cargo quantity to be loaded at each highway port to be stopped at and oil mass to be filled at each highway port to be stopped at, wherein the generate comprises determine the oil mass to be filled at each highway port to be stopped at based on at least the vehicle status information, the cargo quantity at each highway port to be stopped at, and a position of each highway port to be stopped at; and send, by invoking the transceiver, the transport plan to another computer associated with the vehicle, wherein the transport plan is configured to prompt the vehicle to: stop at the highway port, perform loading and/or unloading of cargo according to the cargo quantity to be loaded at the stopped-at highway port, and fill with oil according to the oil mass to be filled.

17. A device for automatic oiling of a vehicle, the device is within the vehicle and comprising a processor and a transceiver;

wherein the processor is configured to:

receive, by invoking the transceiver, a transport plan from an automatic oiling device, wherein the transport plan comprises at least one highway port to be stopped at, and cargo quantity to be loaded at each highway port to be stopped at, and oil mass to be filled at each highway port to be stopped at;

prompt, according to the transport plan, the vehicle to stop at the highway port to be stopped at and perform loading and/or unloading of cargo according to the cargo quantity to be loaded at the stopped-at highway port;

determine, based on information received from a load sensor and an oil tank liquid level sensor, a current load state of the vehicle after the vehicle stops at the highway port to be stopped at,
wherein the load sensor and the oil tank liquid level sensor are located in the vehicle, and
wherein the current load state comprises current actually-loaded cargo quantity received from the load sensor and current filled oil mass received from the oil tank liquid level sensor;
determine actual oil mass to be filled according to the current load state and the cargo quantity to be loaded and the oil mass to be filled at this highway port in the transport plan; and
send, by invoking the transceiver, information of the actual oil mass to be filled at the stopped-at highway port to an oiling device within the highway port, wherein the oiling device is configured to deliver oil fuel to the vehicle according to the actual oil mass to be filled.

18. A device for automatic oiling of a long-distance transport vehicle, the device is within an oiling device and comprises a memory, a processor and a transceiver;
the processor is configured to:
receive, by invoking the transceiver, information of oil mass to be filled from a vehicle;
deliver oil fuel to the vehicle according to the information of the oil mass to be filled;
determine payment information of the filled oil mass; and
send, to another computer associated with the vehicle, a message comprising the payment information, or prompt the payment information.

19. A system for automatic oiling of a long-distance transport vehicle, the system comprising a transport planning system at a network side, an automatic oiling system on a vehicle and an oiling device within a highway port; wherein:
the transport planning system is configured to:
obtain vehicle status information, transport mission information, and highway port information of the vehicle before the vehicle starts from a highway port of departure,
wherein the vehicle status information describes one or more characteristics of the vehicle,
wherein the transport mission information indicates at least a transport route and information about cargo that is loaded or unloaded along the transport route, and
wherein the highway port information indicates one or more highway ports along the transport route;
generate a transport plan according to the vehicle status information, the transport mission information and the highway port information, wherein the transport plan comprises at least one highway port to be stopped at, cargo quantity to be loaded at each highway port to be stopped at and oil mass to be filled at each highway port to be stopped at,
wherein the generate comprises determine the oil mass to be filled at each highway port to be stopped at based on at least the vehicle status information, the cargo quantity at each highway port to be stopped at, and a position of each highway port to be stopped at; and
send the transport plan to the vehicle;
the automatic oiling system of the vehicle is configured to:
receive the transport plan from the transport planning system;
prompt, according to the transport plan, the vehicle to stop at the highway port to be stopped at and perform loading and/or unloading of cargo according to the cargo quantity to be loaded at the stopped-at highway port;
determine, based on information received from a load sensor and an oil tank liquid level sensor, a current load state of the vehicle after the vehicle stops at the highway port to be stopped at,
wherein the load sensor and the oil tank liquid level sensor are located in the vehicle, and
wherein the current load state comprises current actually-loaded cargo quantity received from the load sensor and current filled oil mass received from the oil tank liquid level sensor;
determine actual oil mass to be filled according to the current load state and the cargo quantity to be loaded and the oil mass to be filled at this highway port in the transport plan; and
send information of the actual oil mass to be filled at the stopped-at highway port to the oiling device within the highway port; and
the oiling device is configured to:
receive the information of the actual oil mass to be filled from the vehicle; and
deliver oil fuel to the vehicle according to the information of the actual oil mass to be filled.

* * * * *

UNITED STATES PATENT AND TRADEMARK OFFICE
CERTIFICATE OF CORRECTION

PATENT NO. : 10,800,645 B2  
APPLICATION NO. : 16/035659  
DATED : October 13, 2020  
INVENTOR(S) : Nan Wu Page 1 of 1

It is certified that error appears in the above-identified patent and that said Letters Patent is hereby corrected as shown below:

In the Claims

In Column 17, Lines 16-20, in Claim 1, delete "wherein ...........................at," and insert the same in Line 17, as a new point.

In Column 21, Line 21, in Claim 18, delete "a memory,".

Signed and Sealed this  
Fifteenth Day of December, 2020

Andrei Iancu  
*Director of the United States Patent and Trademark Office*